United States Patent [19]

Ernst et al.

[11] Patent Number: 4,810,107

[45] Date of Patent: Mar. 7, 1989

[54] ROLLING BEARING SEAL

[75] Inventors: Horst M. Ernst, Eltingshausen, Fed. Rep. of Germany; Franco Colanzi, Turin, Italy

[73] Assignee: SKF GmbH, Schweinfurt, Fed. Rep. of Germany

[21] Appl. No.: 207,035

[22] Filed: Jun. 14, 1988

Related U.S. Application Data

[63] Continuation of Ser. No. 940,152, Dec. 9, 1986, abandoned, which is a continuation of Ser. No. 789,612, Oct. 21, 1985, abandoned.

[30] Foreign Application Priority Data

Oct. 19, 1984 [DE] Fed. Rep. of Germany ....... 8430757

[51] Int. Cl.$^4$ ............................................. F16C 33/78
[52] U.S. Cl. ..................................... 384/482; 384/488
[58] Field of Search ............... 384/482, 140, 484, 486, 384/147, 148, 488; 277/95

[56] References Cited

U.S. PATENT DOCUMENTS 4,505,484 3/1985 Ohkuma et al. .................... 384/482

FOREIGN PATENT DOCUMENTS 0622418 3/1946 United Kingdom .

Primary Examiner—Lenard A. Footland
Attorney, Agent, or Firm—Rosen, Dainow & Jacobs

[57] ABSTRACT

A seal for a rolling bearing having an inner bearing ring, an outer bearing ring, and rolling elements rolling in races therebetween, wherein a cover is affixed to the outer bearing ring and carries a sealing lip engaging the side surface of a groove adjacent an end of the inner bearing ring. A shoulder at the end of the inner bearing ring defines a gap seal with the cover. The cover extends substantially normal to the axis of the bearing and the sealing lip is either slightly conically inclined, or defines an annular outwardly extending groove.

3 Claims, 1 Drawing Sheet

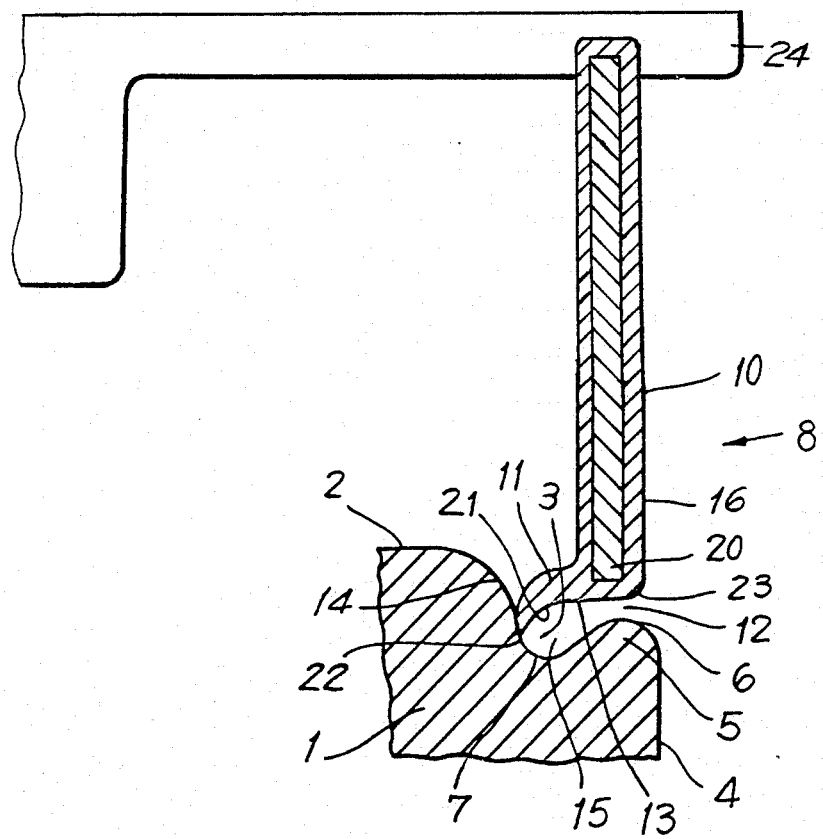

ROLLING BEARING SEAL

This application is a continuation of application Ser. No. 940,152, filed on Dec. 9, 1986, now abandoned, which is a continuation of application Ser. No. 789,612, filed Oct. 21, 1985, now abandoned.

FIELD OF THE INVENTION

This invention relates to seals and is in particular directed to the provision of an improved seal for a rolling bearing, of the type wherein a cover is provided extending from one ring of a rolling bearing, the cover having a seal adapted to form a seal with the other bearing ring.

BACKGROUND OF THE INVENTION

U.K. Pat. No. 622,418 discloses a rolling bearing in which a cover is held in a recess of the outer ring. The cover has a U-shaped cross section in the region of the outer seal and receives a seal of elastic material in the annular groove thereby formed in the cover. A groove having a boundary surface on both of its sides is machined in the edge of the inner ring inwardly from the shoulder surface, so that a small outer shoulder remains, with this outer shoulder forming a seal gap with the seal depending from the cover. The seal has a sealing lip at its inner edge, the lip running on the axially inner side surface of the groove of the inner ring with prestress. The prestress is produced as a result of the inwardly inclined mounting of the seal in the radially outer annular groove of the cover. The seal is thereby axially inwardly curved to a great extent and defines a relatively large hollow space with the cover, the hollow space extending from the outer mounting to the inner ring. An especial disadvantage of this seal arises from the fact that during use dirt particles and moisture entering through the gap between the cover and the inner ring are stored up or deposited in the hollow space and thereby change the prestress of the seal. Depending upon the embodiment of the seal, it can thereby be more greatly inwardly curved, giving rise to the danger of an undesirable contact with the bearing cage with the resultant lifting off of the sealing lip by tipping over the edge side surface of the groove to the shoulder. Furthermore, the greatly curved element requires a very large axial space for satisfactory operation, so that the known bearing requires considerably larger axial space than bearings having otherwise similar functions.

SUMMARY OF THE INVENTION

The object of this invention is the production of a sealed rolling bearing of the above type that has a seal of minimum width with at least two seal regions and in which the dirt or moisture accumulating between the sealing regions has no influence on the operation of the seal.

In accordance with the invention this object is achieved by providing an arrangement wherein the sealing lip is connected to the inner edge region of the cover and an annular surface is provided between the gap seal and the sealing lip. In the preferred embodiment of the invention the sealing lip is conically inclined and radially set back a small distance.

The sealing lip is preferably affixed to the radially inner edge of the inner surface of the cover, in known manner, for example, by vulcanization. From there it extends in the axial inner and slightly radially inwardly inclined direction of the rolling bearing and runs with prestress, radially inwardly curved, on the axially inner side surface of the groove of the bearing inner ring. In this prestressed position it has no influence on the position of the stiff mounted cover and on the operation of the sealing gap. Advantageously, for prestress the elastic sealing lip extends only radially inwardly in the region of the inner ring, i.e. running on the side of the groove of the inner ring, so that only the relatively thin cover piece is positioned between the side of the bearing and the next movable bearing element, for example, the cage. As a result, since a seal with two sealing regions is active, the bearing width is not greater than the conventional rolling bearing without seals or without a simple cover. The sealing lip can have many variations in its shape. It forms an inner annular surface together with the inner edge of the cover, the inner annular surface, for example, being conically outwardly inclined. In this case, no hollow space is provided between the sealing lip and the cover, so that dirt and moisture will have a tendency during the turning movement to be outwardly centrifuged away. The outer shoulder region of the inner running ring is so shaped that it forms a centrifuge edge together with the surface of the inner ring. Thereby dirt particles in the region of the inner ring are advantageously radially outwardly centrifuged as a result of the centrifugal force along on the sealing gap.

In accordance with a further feature of the invention the cover is surrounded on all sides with the material of the sealing lip. As a result, the sealing lip has an additional form-closing mounting and is not fastened solely by adhesion. This arrangement in addition provides good corrosion protection for the cover.

The cover is advantageously produced of steel sheet metal, although it can alternatively be made of a plastic material.

BRIEF DESCRIPTION OF THE DRAWING

In order that the invention may be more clearly understood it will now be disclosed in greater detail with reference to the accompanying drawing, wherein the FIGURE is a partial longitudinal section of a rolling bearing with a seal with conically inclined inner annular surface.

DETAILED DESCRIPTION OF THE PREFERRED EMBODIMENT

Only the sealing region of one side of the rolling bearings in accordance with the invention is illustrated in the figure. In order to stress the features in accordance with the invention, the rolling elements and cage have not been illustrated. The outer ring is shown at 24. In a rolling bearing of this type, the rolling elements are supported in the cage, and roll between races of the inner and outer rings. In the illustrated embodiment of the invention, the outer bearing ring is radially outwardly of the inner ring. The rolling elements may be balls or rollers in accordance with conventional practice. The race for the inner ring may, for example, be formed in the shoulder surface 2. It is, of course, apparent that the invention is not limited to the particular configuration employed for these elements. The inner ring 1 has an annular groove 3 machined radially in the shoulder surface 2. The groove 3 is formed axially sufficiently close to the side surface 4 of the inner ring that only a small shoulder section 5 with radially outer shoulder surface 6 is provided between the groove 3 and the end surface 4. The shoulder 5 is set deeper in the inner ring, i.e. radially inwardly of the shoulder surface 2, so that the outer shoulder surface 6 has a diameter between that of the axial inward shoulder surface 2 of the bearing inner ring and the bottom 7 of the groove 3. The seal 8 is affixed to the outer bearing ring (not shown) by any conventional technique so that when the bearing is in use, a relative rotational movement is provided between the seal 8 and the inner ring 1.

The seal 8 according to the Figure is comprised of a cover 9 surrounded on all sides by an elasic material 10, and a sealing lip 11 formed on the radial and axial inner edge region of the elastic material. The cover 9 inclusive of the thin layer of elastic material 10 forms a fixed position gap seal 12 with the outer shoulder surface 6 of the inner ring. The sealing lip 11 extends substantially in the axial direction, and is slightly radially inwardly inclined. The sealing lip thus has a conical inner annular surface 13 with the decreasing diameter axially inwardly of the bearing. The free end of the sealing lip 11 runs under prestress on the axially inner side surface 14 of the groove 3. As a consequence, the sealing lip, especially at its free end, is slightly radially inwardly curved. The inner annular surface 13 of the seal 8 and the radially outer surface of the groove 3 define an annular hollow space 15 opening axially outwardly of the bearing through the gap seal 12. The axially outer end surface 16 of the seal 8 is displaced a short distance back from the end surface 4 of the inner ring 1 (i.e. it is positioned axially inwardly of the end surface 4). In this manner, the transition between the outer shoulder surface 6 and the end surface 4 of the inner ring 1 serves as a centrifuge edge. the seal member comprises an end region 20 of the cover 9, an axially inner end 21 of the annular surface 13, and a point 22 where the sealing lip 11 contacts the annular groove 3. The gap seal 12 comprises a surface 23.

As shown in the Figure, the diameter of the common surface 13 of the annular surface extending axially outwardly from the point 22 where the sealing lip 11 contacts the annular groove 3, is everywhere greater than or equal to the diameter of the sealing lip contact point 22.

The diameter of the common surface of the annular surface 13 and the surface 23 of the gap seal 12 extending from the point 22 where the sealing lip 11 contacts the annular groove 3, is everywhere greater than or equal to the diameter of the sealing lip contact point 22.

As clearly shown in the Figure, the common surface of the annular surface 13 and the surface of the adjacent sealing lip 11 from its contact point 22 is a smooth continuous surface which montonically increases, that is, increases steadily without decreasing, in an axially outward direction.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. In a sealed rolling bearing having first (1) and second coaxial bearing rings and rolling elements positioned to roll therebetween, a seal member (8) comprising a cover (9) affixed to the second bearing ring and having an end region (20) disposed toward the first bearing ring (1), said seal member including a sealing lip (11) running prestress on a surface (14) of an annular groove (3) formed in a shoulder (2) of the first bearing ring, and a gap seal (12) formed between the end region (20) of said cover (9) and an axially outer shoulder surface (6) of the first bearing ring (1), said seal member (8) including an annular surface (13) arranged between the gap seal (12) and the sealing lip (11), the improvement wherein the annular surface (13) extends axially inwardly from the end region (20) of the cover (9), the axially inner end (21) of said annular surface (13) includes the axially outward surface portion (21) of said sealing lip (11), and wherein said sealing lip (11) extends towards and makes continuous contact only on a portion (14) of the inner side of the surface of said annular groove (3) which is remote from said end region (20) of the cover, said annular surface (13) forming a hollow space (15) with said annular groove (3) and being integral with said gap seal (12), the diameter of the common surface (13) of said annular surface extending axially outwardly from the point (22) said sealing lip (11) contacts said annular groove (3) is everywhere greater than or equal to the diameter of the sealing lip contact point (22).

2. The sealed rolling bearing of claim 1, wherein the diameter of the common surface of said annular surface (13) and the surface (23) of said gap seal (12) extending from the point (22) said sealing lip (11) contacts said annular groove (3) is everywhere greater than or equal to the diameter of the sealing lip contact point (22).

3. The sealed rolling bearing of claim 1 or 2, wherein said common surface of said annular surface (13) and the surface of said adjacent sealing lip (11) from its contact point (22) is a smooth continuous surface which monotonically increases in an axially outward direction.

* * * * *